United States Patent
Eickhoff et al.

(10) Patent No.: US 11,196,061 B2
(45) Date of Patent: Dec. 7, 2021

(54) LONG ENDURANCE FUEL CELL-BASED POWER SOURCE

(71) Applicant: Honeywell International Inc., Morris Plains, NJ (US)

(72) Inventors: Steven J. Eickhoff, Brooklyn Park, MN (US); James Tory Burgess, Madison, AL (US)

(73) Assignee: Honeywell International Inc., Charlotte, NC (US)

(*) Notice: Subject to any disclaimer, the term of this patent is extended or adjusted under 35 U.S.C. 154(b) by 87 days.

(21) Appl. No.: 16/799,470

(22) Filed: Feb. 24, 2020

(65) Prior Publication Data

US 2021/0265643 A1    Aug. 26, 2021

(51) Int. Cl.
| | | |
|---|---|---|
| *H01M 8/04119* | (2016.01) | |
| *H01M 8/22* | (2006.01) | |
| *B64C 39/02* | (2006.01) | |
| *H01M 8/04082* | (2016.01) | |

(52) U.S. Cl.
CPC ....... *H01M 8/04141* (2013.01); *B64C 39/024* (2013.01); *H01M 8/04201* (2013.01); *H01M 8/22* (2013.01); *H01M 2250/20* (2013.01)

(58) Field of Classification Search
CPC .............. H01M 8/04141; H01M 8/22; H01M 8/04201; H01M 2250/20
See application file for complete search history.

(56) References Cited

U.S. PATENT DOCUMENTS

| | | | |
|---|---|---|---|
| 2016/0043807 A1* | 2/2016 | Davidson | H02K 7/1807 398/116 |
| 2017/0200961 A1* | 7/2017 | Zheng | H01M 8/0662 |

* cited by examiner

*Primary Examiner* — Stewart A Fraser
(74) *Attorney, Agent, or Firm* — Schwegman Lundberg & Woessner, P.A

(57) ABSTRACT

An air system includes a fuselage, a motor supported by the fuselage, a propeller coupled to the motor, a fuel cell-based power generator supported by the fuselage and the motor, and a satellite communication system coupled to the fuel cell system. The generator includes a hydrogen generator, a fuel cell having an anode and a cathode, a cathode loop configured to provide oxygen to the cathode, an anode loop configured to provide hydrogen generated by the hydrogen generator to the anode, and an electrical connector coupled to the fuel cell to provide electricity generated by the fuel cell to the motor.

20 Claims, 9 Drawing Sheets

LONG ENDURANCE FUEL CELL-BASED POWER SOURCE

BACKGROUND

Batteries have been used as a power source for many applications, such as small unmanned air systems (UAS). The endurance of such systems has been limited to visual line of sight operation due to the low energy density of the batteries. Higher density, lighter weight energy sources are needed for longer flights.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Figure 1:
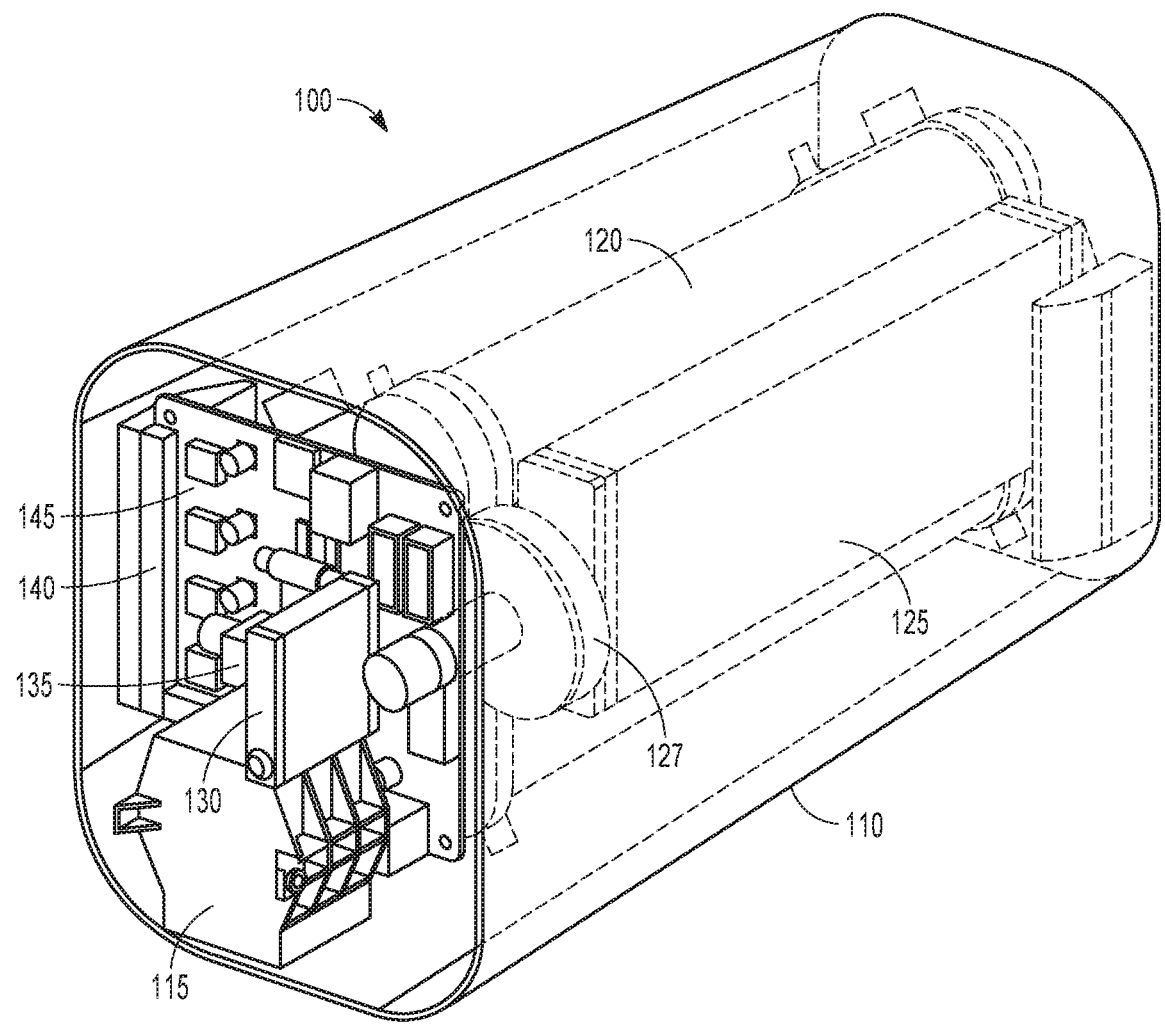
FIG. 1 is a cut-away perspective representation of a fuel cell-based power source according to an example embodiment.

FIG. 1 is a cut-away perspective representation of a fuel cell-based power source 100 according to an example embodiment. Components of the power source 100 may be packaged together inside of a container 110, which may comprise an aircraft fuselage that is exposed to airflow as the aircraft moves thought the air and is powered by the power source 100. The container may have a length longer than its sides and have a substantially rectangular cross section with rounded corners in one embodiment. Other shapes may be used in further embodiments sized to hold the components of the power source 100. Not all components of the power source 100 are visible in FIG. 1 and are described in further detail in FIGS. 2 and 3.

A fuel cell stack 115 is located near a front of the container 110 and includes multiple fuel cells that receive hydrogen at an anode side of each cell from a hydrogen generator 120 that contains hydrogen producing fuel. The hydrogen generator may be cylindrical in shape and may extend along a length of the container 110 to enable sufficient fuel to enable long flights of the aircraft. The fuel cell stack 115 receives air at a cathode side of each cell from ambient and generates electricity from a reaction of the hydrogen and oxygen. The reaction also produces water at the cathode side.

A water exchanger 125 may receive water produced at the cathode side and transfers the water to an input to the hydrogen generator 120. The water reacts with the fuel to provide hydrogen to the anode side of the fuel cell stack. An anode blower 127 may be positioned between the hydrogen generator 120 and the anode side of the fuel cell stack 115 to control rate of flow and pressure of the hydrogen.

In one embodiment, a fuel cell heat exchanger 130 is thermally coupled to the fuel cell stack to remove heat generated by the reaction in the fuel cell stack 115. A fuel cell pump 135 may be used to pump fluid, such as water through the fuel cell heat exchanger 130 to aid in cooling. The container 110 may also include a cooling air inlet 140 to further aid in cooling. Control electronics 145 may be coupled to control one or more pumps, valves, and blowers.

Power source 100 may be used to power an unmanned air system (UAS) such as a fixed wing UAS as well as other devices, providing a higher density of energy. The higher density of energy may be provided at a reduced weight, such that the UAS may have a total weight of under 55 lbs. in one embodiment. Such a UAS may be used for pipeline inspections with a flight time measured in hours instead of minutes. In some embodiments, light-weight satellite communications capabilities referred to as SATCOM may be included as part of or in addition to control electronics 145. In further embodiments, a satellite communications module may be supported by the UAS external to container 110 and may be powered by the power source 100.

Figure 2:
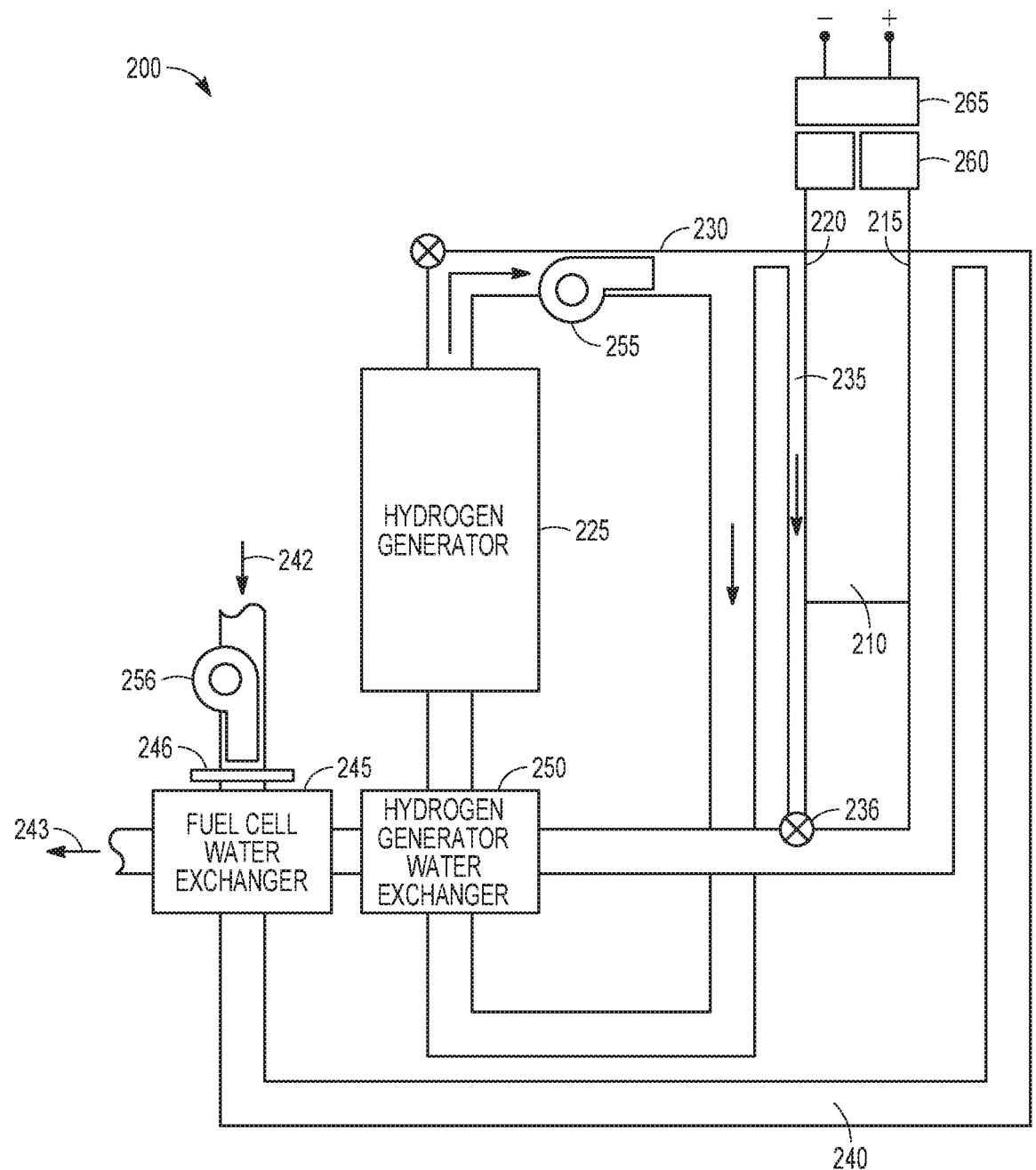
FIG. 2 is a block diagram illustrating components and operation of a fuel cell-based power source according to an example embodiment.

FIG. 2 is a schematic diagram illustrating components and operation of a fuel cell-based power source 200 according to an example embodiment. Hydrogen is generated based on lithium aluminum hydride (LAH) vapor hydrolysis in which water vapor for the hydrolysis reaction is recovered from the fuel cell.

Power source 200 includes a PEM fuel cell stack 210 having a cathode 215 and an anode 220. Hydrogen is provided by a hydrogen generator 225 via a hydrogen loop 230, also referred to as an anode loop, to the anode 220. The hydrogen loop continuously recirculates generated hydrogen back to the hydrogen fuel. The hydrogen loop 230 includes a portion 235 that branches off the anode loop 230 and extends adjacent to the anode 220. The portion 235 dead ends at a purge valve 236 that may be used to purge the portion 235 of inert gases (e.g. nitrogen, water vapor) that build up over time in the portion 235. Such gases may be purged periodically into the cathode loop upstream of the hydrogen generator water exchanger 250 by actuating the purge valve 236, for example, based on predetermined timing or a sensed parameter like fuel cell voltage or hydrogen concentration. In some embodiments, the purge valve 236 may be slightly open most of the time to continuously remove the inert gases, with most of the hydrogen flowing to and being consumed by the anode of the fuel cell.

An air or cathode loop 240 receives air from ambient 242 and provides the air to the cathode 215. In proton exchange membrane (PEM) fuel cells, water is produced at the fuel cell cathode 215 as a byproduct of electricity production: 4H2 (from the hydrogen/anode loop 230, 235)+2O2 (from the air/cathode loop 240)→4H2O+Electricity. A portion of the water vapor is recycled into the air/cathode loop 240 via a fuel cell water exchanger 245, to heat/humidify the received ambient air 242 and improve fuel cell performance. In some embodiments, an ammonia filter 246 may be positioned in the air/cathode loop between ambient 242 and the fuel cell water exchanger 245 to remove ammonia from air. Removal of ammonia may enhance the life of the fuel cell water exchanger 245 as discussed further below.

A hydrogen generator water exchanger 250 may be provided in the hydrogen loop 230 to transfer water generated by the fuel cell cathode 215 from the air loop 240 to the anode hydrogen (H2) loop 230. The hydrogen loop 230 continues to the hydrogen generator 225 with sufficient water vapor to produce more hydrogen. In one embodiment, the hydrogen loop 230 is a closed loop, resulting is little to no water being lost in the loop, other than to create hydrogen.

The hydrogen generator 225 may be in the form of a replaceable cartridge containing a packed bed of porous, highly engineered LAH fuel. The water vapor reacts spontaneously with the LAH and produces H2 by the following reaction: LiAlH4+XH2O→4H2+Solids, where X≈2.4 at one example target operating condition, meaning approximately 2.4/4=60% of the water produced by the fuel cell is recycled. Low-pressure H2 is circulated continuously in the hydrogen loop 230 using a blower fan 255, at a pressure (a few psig) sufficient to flow H2 gas into the fuel cell via the loop portion 235.

The anode blower fan 255 may be controlled to maintain constant H2 pressure in the anode/hydrogen loop 230, while a cathode blower 256, shown proximate the ambient air intake 242 is controlled to maintain constant fuel/air stoichiometry at the fuel cell cathode 215. Both blowers 255, 256 may be responsive to changes in electrical load. In one example embodiment, the power source 200 produces ~2 W of waste heat per W of electrical power (1 W from the fuel cell and 1 W from the hydrogen generator 225. A cooling system may be used to manage heat dissipation to maintain system temperature in the range (60-90° C.) for ideal reaction rates and hydrolysis stoichiometry. One or more LiPo batteries 260 and associated power management/control electronics 265 handle startup and load transients.

In some embodiments, the fuel cells 210 provide current to control electronics 265 that charges the battery or batteries 260. The control electronics 265 also provides power to a load, such as the UAS. In some implementations, the batteries 260 can provide the ability to supply higher and more dynamic levels of power than simply utilizing the fuel cells directly, which can be slower to respond and not normally be able to provide high levels of power that may be required for operation of the UAS in a desired manner, such as accelerating sufficiently while carrying a load.

Control electronics 265 may comprise microprocessor, circuitry, and other electronics to receive data representative of sensed pressure, temperature, humidity, and other parameters and utilize control algorithms, such as proportional/integral/derivative (PID) or other type of algorithms to control mechanisms to modify the parameters to meet one or more different setpoints. Control electronics 265 may also be referred to as a power management module or controller 265. In some embodiments, control may be based on proportional controller.

Modifying the speed of blower 255 can affect operating parameters of various components of power generator 200. For example, modifying the speed of blower 255 to modify the pressure in anode loop 230 can maintain an inlet and outlet relative humidity of fuel cell 210 within a predetermined range, maintain an inlet and outlet relative humidity of hydrogen generator 225 within a predetermined range, maintain an inlet and outlet relative humidity of water exchangers 245 and 250 within a predetermined range, and/or a temperature of the water exchangers within a predetermined range, among other operating parameters and/or other operating parameters of other components of power generator 200.

Various sensors can be utilized to monitor components of power generator 200. For example, the various components of power generator 200 can include temperature sensors that can transmit temperatures of hydrogen generator 225, fuel cell 210, and/or the water exchangers 245, 250 to controller 265. In some examples, controller 265 can maintain operating temperatures of the hydrogen generator 225, fuel cell 210, water exchangers using the blowers 255 and 256. In some examples, controller 265 can maintain operating temperatures of the hydrogen generator 225, fuel cell 210, and/or water exchangers utilizing a pump circulating cooling fluid to the components of power generator 200 (e.g., operation of the pump circulating the cooling fluid can lower the operating temperatures).

In some examples controller 265 can provide inputs to power generator 200 based on a current draw by the load (e.g., a UAS) from batteries 260. Controller 265 can receive an amount of current draw from batteries 260 coupled to fuel cell 210.

Hydrogen generator 225 in some embodiments is a high-rate hydrogen generator suitable for man-portable power and micro air vehicle applications that provides four to five times the hydrogen of commercially available hydrogen sources of the same size and weight. Many different hydrogen producing fuels, such as LAH (LiAlH$_4$) may be used. In further embodiments, the hydrogen producing fuel may, for example, include AlH$_3$, NaAlH$_4$, KAlH$_4$, MgAlH4, CaH$_2$, LiBH$_4$, NaBH$_4$, LiH, MgH$_2$, Li$_3$Al$_2$, CaAl$_2$H$_8$, Mg$_2$Al$_3$, alkali metals, alkaline earth metals, alkali metal silicides, or combinations of one or more thereof.

Figure 3:
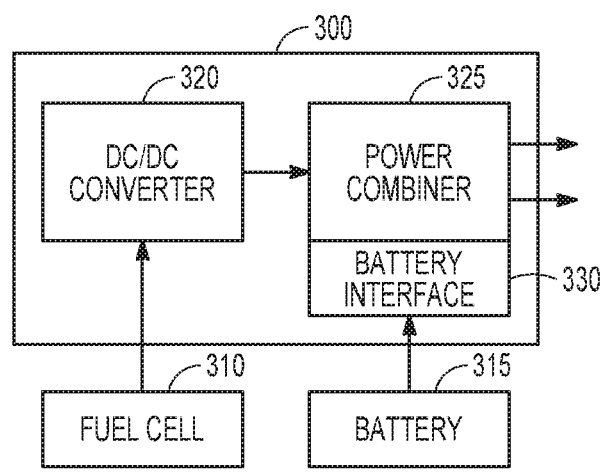
FIG. 3 is a simple block diagram of a fuel cell power management controller according to an example embodiment.

FIG. 3 is a simple block diagram of a fuel cell power management controller 300. Controller 300 provides power to the UAS from a fuel cell 310 and/or an LiPo battery 315. Controller 300 includes a DC to DC converter 320 to convert the voltage of current provided by the fuel cell 310 to a power combiner 325. The power combiner 325 is coupled via a battery interface 330 to the battery 315. In the event of a fuel cell system or battery fault, the remaining power source provides power to safely land the UAS. Controller 300 may trigger an alarm to alert the user of the fault and the need to land. In addition, battery 315 may be used to provide power during startup and load transients, such as climb-out and maneuvering.

Airflow generated by the aircraft and routed through heat exchangers in the fuselage (see 900 in FIG. 9) may be used to cool the fuel cell system 200. An air scoop may be added to the fuselage, and servo-controlled dampers may be added to independently control airflow over the H2 generator and fuel cell heat exchanger.

Figure 4:
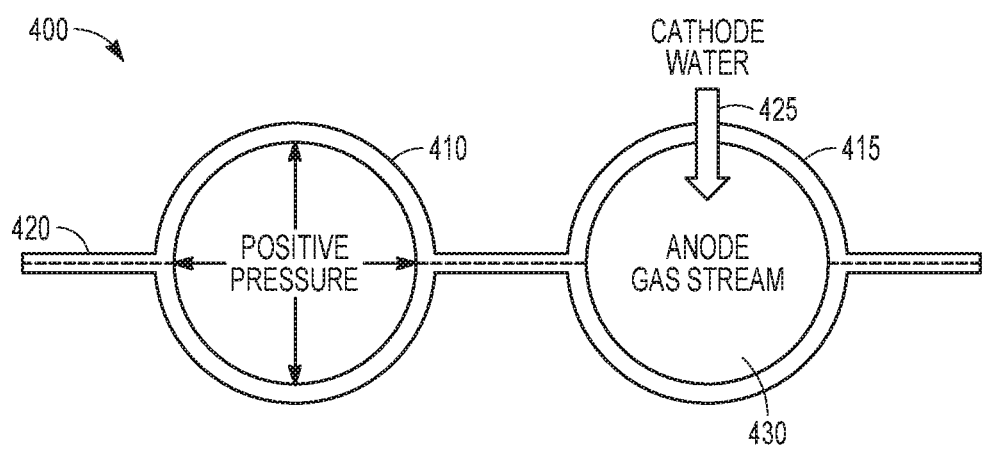
FIG. 4 is a schematic diagram illustrating water transfer in a light-weight water exchanger according to an example embodiment.

FIG. 4 is a schematic diagram illustrating water transfer in a light-weight water exchanger 400. To create a light-weight water exchanger suitable for UAS, a reinforced composite PFSA membrane formed into arrays of tensile membrane tubes 410, 415 that are inflated by a small gauge pressure of the fuel cell anode that creates a positive pressure in the tubes. The tubes carry the anode gas stream flowing inside the tubes. The cathode gas stream from the cathode loop flows outside the tubes. Water from the cathode gas stream permeates through the membrane into the dryer anode gas stream, effectively exchanging water from the cathode gas stream to the anode gas stream while preventing the gases from mixing.

The membrane may comprise two layers of thin PFSA supported by an internal layer of fc. The added strength enables up to a ~10× reduction in membrane thickness and commensurate reduction in weight as well as more efficient water transfer. The of larger tube diameters may be optimized for the pressure head characteristics of light-weight blowers. The tube arrays may be bonded via heat seal or adhesive.

Figure 5:
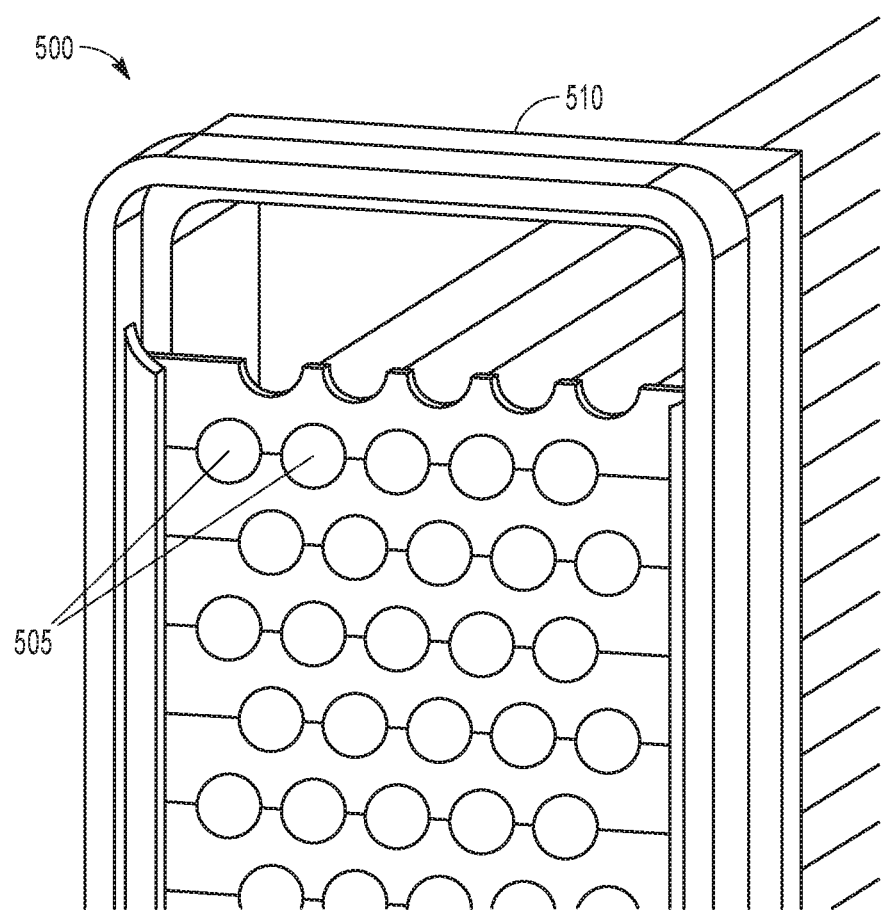
FIG. 5 is a perspective representation of membrane tubes potted in a staggered arrangement within a polymer frame according to an example embodiment.

FIG. 5 is a perspective representation 500 of membrane tubes 505 potted in a staggered arrangement within a polymer frame 510. Several rows of tubes may be supported within the frame 510.

Figure 6:
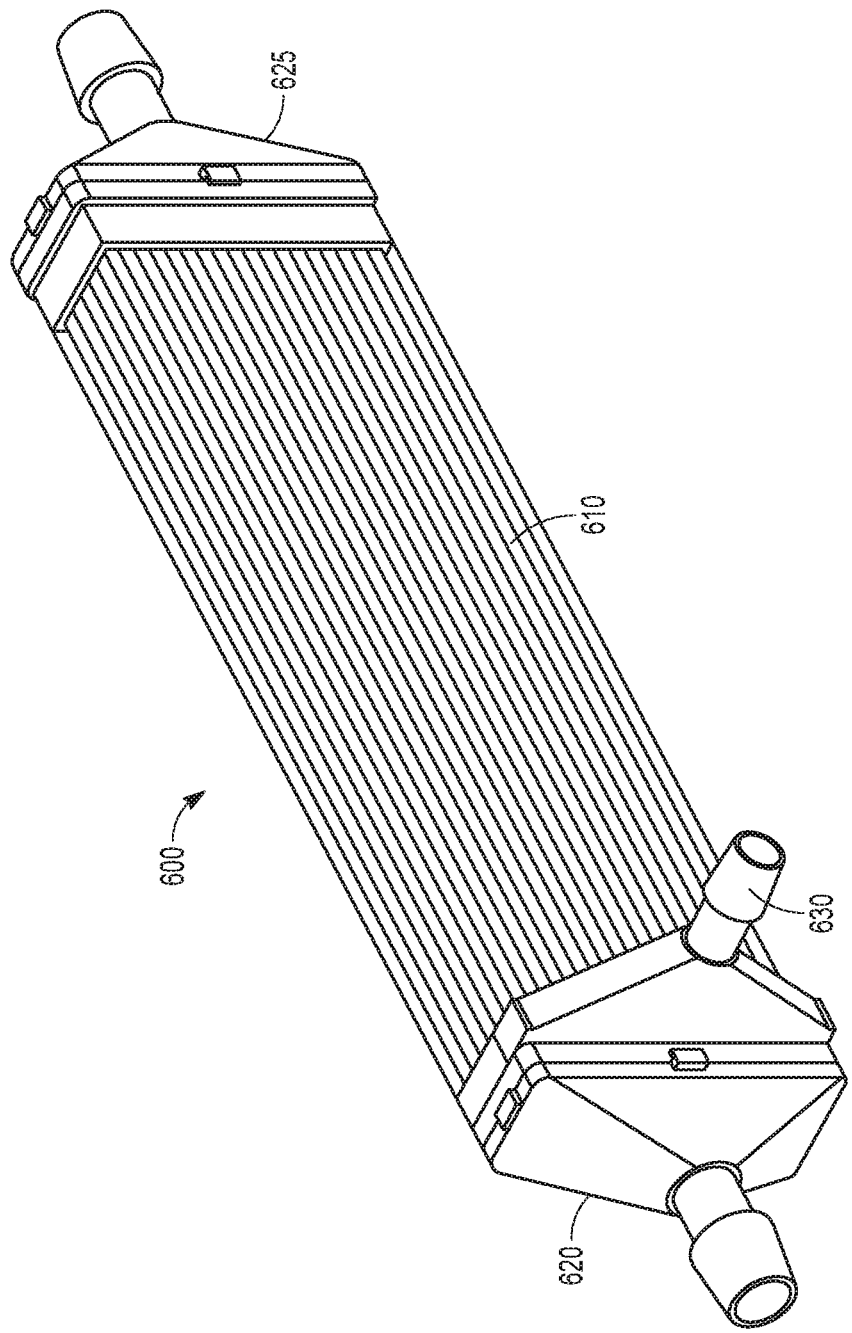
FIG. 6 is a perspective representation of a water exchanger enclosed within a frame having multiple manifolds to direct gas through and around tubes within the frame according to an example embodiment.
Figure 8:
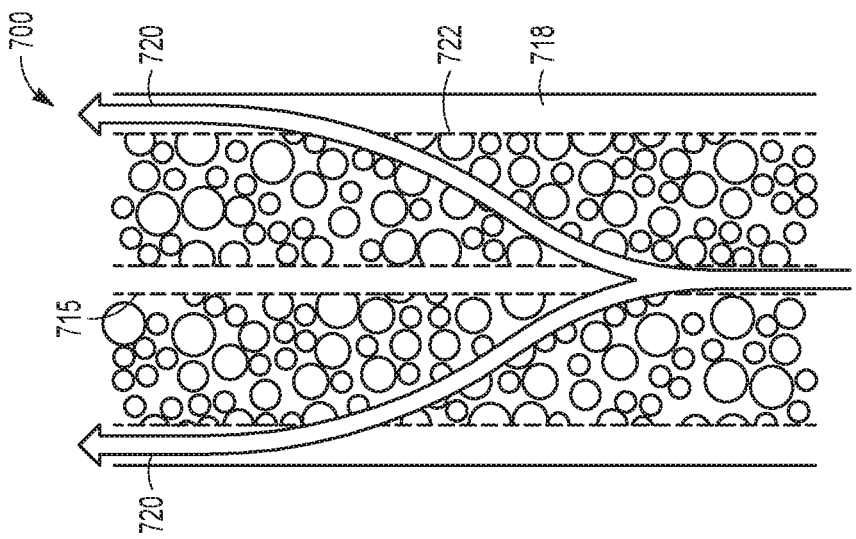
FIG. 8 is a cross section taking along a length of hydrogen generator fuel rod according to an example embodiment.

FIG. 6 is a perspective representation of a water exchanger 600 enclosed within a frame 610 having multiple manifolds to direct gas through and around tubes within the frame 610. Anode gas flow through the tubes is directed via manifolds 620 and 625 disposed on opposite ends of the length of the exchanger 600. Manifold 630 provides the wet cathode gas flow to the outsides of the tubes. Dry H2 (anode gas stream) flows through the center of the tubes while humid air (cathode gas stream) flows over the outside in a counterflow arrangement; water permeates from cathode to anode due to the water concentration gradient across the membrane. Packaging components such as the frame 610 and manifolds may be constructed from high-performance plastics (e.g. Ultem, Mylar) and 3D printed plastics and bonded using adhesives.

In one embodiment, the membrane comprises a perfluorosulfonic acid (PFSA)—a Teflon-type polymer doped with sulfonic acid groups that enables high water permeability and selectivity vs. atmospheric gases and H2, such as a Gore 815. A thermal bonding fixture may be configured to produce multi-tube arrays with consistent, high-strength bonds with low leak rates, and burst pressures of >26 psig in one embodiment. Tube diameters, pitch, length and number of tubes may be adjusted to tradeoff pressure drop, weight, and volume depending on application requirements.

Ammonia, even in parts per billion concentrations in ambient atmosphere reacts with the sulfonic acid groups over time and effectively neutralizes them, resulting in degraded membrane transport properties. Various filtration options, such as those based on ion exchange as well as chemical scrubbers based on potassium permanganate or phosphoric acid may be used to minimize the exposure to ammonia as illustrated at ammonia filter 246 in FIG. 2 positioned between blower 256 and fuel cell water exchanger 245.

Figure 7:
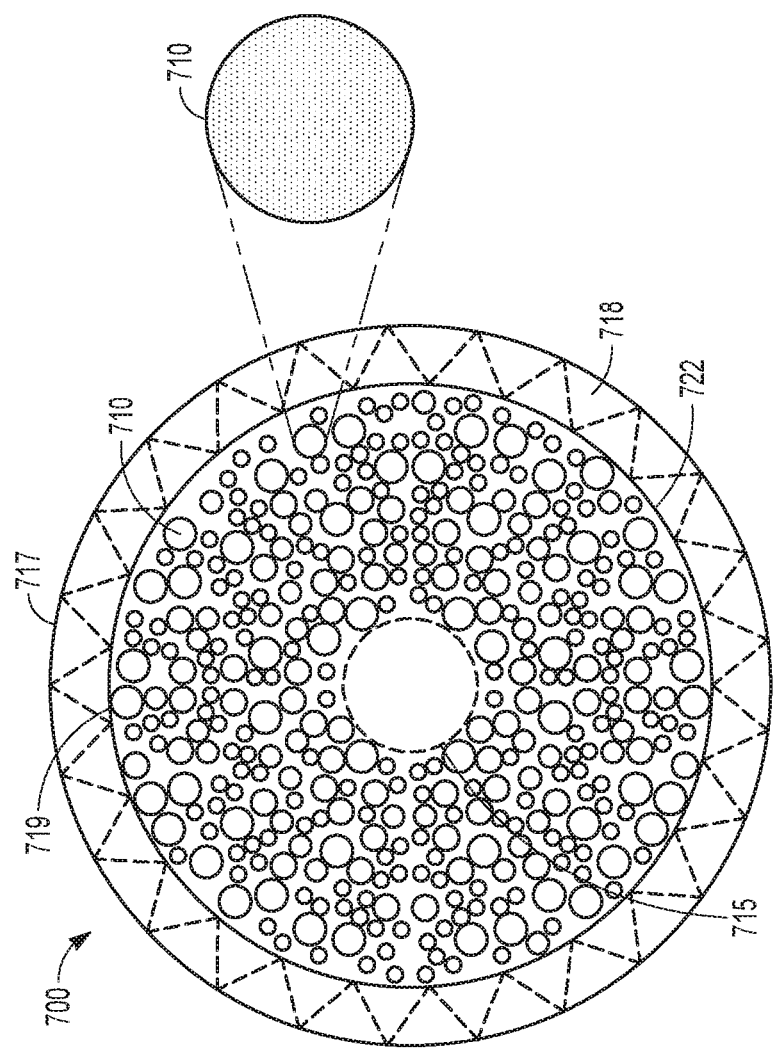
FIG. 7 is a cross section view of a hydrogen generator fuel rod according to an example embodiment.
Figure 11:
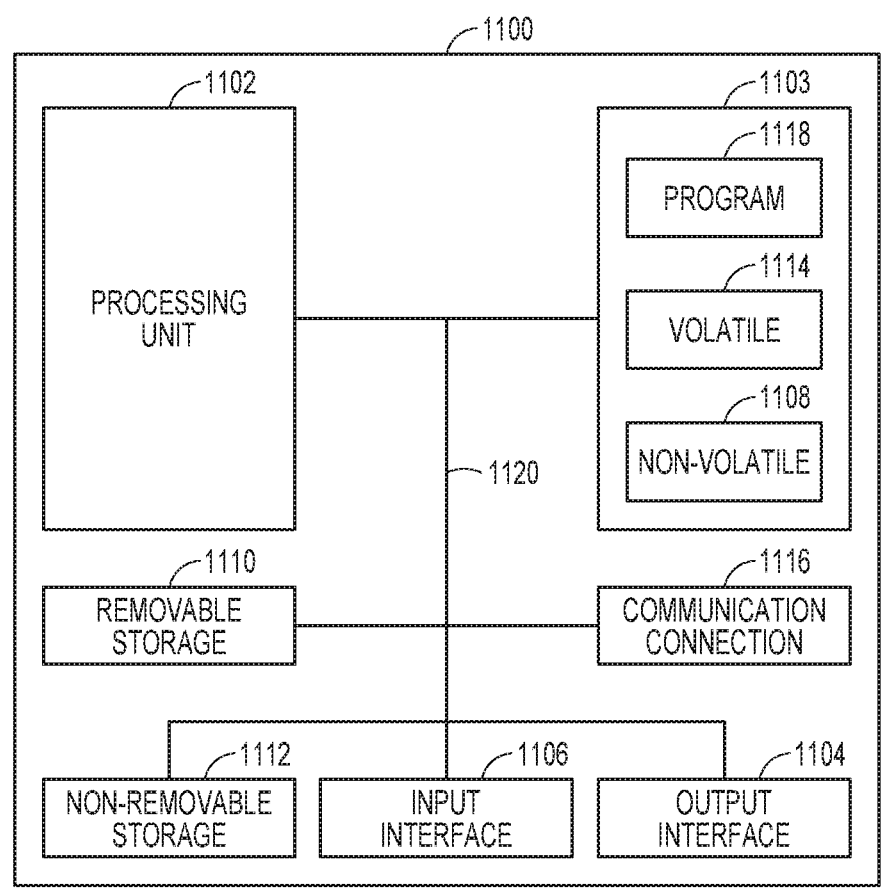
FIG. 11 is a block schematic diagram of a computer system to implement one or more example embodiments.

As previously described, the H2 generation process uses water vapor from ambient and recovered from the fuel cell stack to provide water for a hydrolysis reaction with LAH. This process extracts 21.2% H2 by starting weight from LAH—half (10.6%) from LAH, and the other half "for free" from the water vapor recovered from the fuel cells. FIG. 7 is a cross section view of a hydrogen generator fuel rod 700. FIG. 11 is a cross section taking along a length of hydrogen generator fuel rod 700. To generate H2, water vapor-contain gas is flowed through a packed bed of LAH granules 710. The granules 710 are disposed around a central gas flow channel 715. An outer wall 717 may be coaxial with the passage 715 and includes a corrugated structure providing a hydrogen channel 718 between the outer wall 717 and an inner wall 719. The granules 710 form a single fuel rod 700 comprised of an annular packed bed of porous LAH contained between corrugated (e.g. screen) flow channels 718. The outer wall 717 includes a gas-tight light-weight sheath. The inner wall 722 on the inside of the corrugation is an optional gas permeable "particulate filter" that keeps fuel particles from getting into the flow channel 718 while allowing gas to flow through it. Water-vapor-containing gas flows both radially and axially into the granules 710 as indicated by arrows 720 and reacts with the LAH fuel granules to release H2, and the H2 reacts with oxygen in the fuel cell to form water in the following series of reactions:

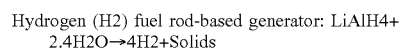

Hydrogen (H2) fuel rod-based generator: LiAlH4+ 2.4H2O→4H2+Solids

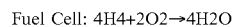

Fuel Cell: 4H4+2O2→4H2O

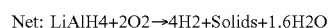

Net: LiAlH4+2O2→4H2+Solids+1.6H2O

Packaging fuel in an array of independent fuel rods in the shape of cylinders or tubes with suitable manifolds to direct moist gas and dry hydrogen allows for cooling air to be directed between them. Radial flow through the fuel bed, in which the reaction front is spread over a larger area, yields more efficient water use and better temperature uniformity. This arrangement also allows pressure drop to be optimized independent of tube length and minimizes packaging.

The physical properties of LAH (grain 710 size, granule size/porosity) and configuration within the H2 generator may be engineered to meet specific requirements for each different UAS, as raw (powdered LAH) has insufficient rate and excessive pressure. The primary considerations for the fuel formulation are high water utilization, high reactivity, and low pressure drop.

Smaller grain size yields higher reaction rates, which translates to greater reaction yield before the reaction rate falls below the power cutoff for the system. The grain size used one example fuel formulation of 5-10 um may be used.

Larger granules yield a lower pressure drop across the fuel bed with a small cost in reaction rate. A granule size range of 0.5-3 mm may be used to balance the reaction rate-pressure drop tradeoff for the intended application.

In addition to reducing grain size, improving flow uniformity through the fuel bed can provide the increased reaction rates. The geometry, size, flow resistances may be adjusted to achieve desired production rates, pressure drops, and temperature profiles.

Flow manifolds may be used to connect multiple and appropriately sized cooling fans of airflow from the aircraft to cool the hydrogen generator in further embodiments. The hydrolysis reaction creates 1 W of heat for each Watt of H2 produced, resulting in self-heating to its operating temperature, and may require cooling during normal operation.

Figure 9:
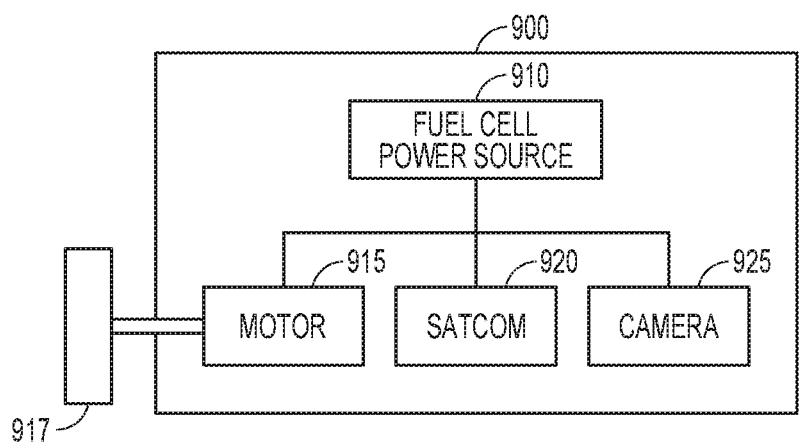
FIG. 9 is a block diagram of a UAS incorporating a fuel cell-based power generator according to an example embodiment.

FIG. 9 is a block diagram of an air system or aircraft, referred to as UAS that has a fuselage 900 incorporating a fuel cell-based power generator 910. As previously described, the power generator 910 may be incorporated into a fuselage 900, which may be a fixed wing UAS, such as an airplane. Fuselage 900 is also representative of one or more fixed wings. The UAS 900 may include a motor 915 coupled to drive a propeller 917 using energy from the power source 910 to move the UAS 900 through the air. An average power 910 used in one example UAS may be 160 W. Peak power may be handled by a small LiPo battery.

The SATCOM 920 may be a reduced weight satellite communication device. The dominating weight component in a typical L-band SATCOM system may be in heat dissipation structures (heatsinks) associated with radio frequency (RF) power amplification (PA). Civil and general aviation (GA) SATCOM installations are required to generate enough RF power, not only to meet the correct transmit power, but to overcome associated cable losses between the modem and the RF chain to the antenna. In a civil or GA installation the cable length could be significant—many tens of meters. With the RF components we used in a small SATCOM system, the normal expectation for GA would be a 4 dB cable loss between modem and RF stages to the antenna, to accommodate for a large separation. This would mean an additional 4 dB of power would be required to meet the transmit power requirements at the antenna. However, if the cable losses are reduced by shortening the cables to suit a much smaller UAS installation such that the cables are proximate power amplifier circuitry, an operating power reduction occurs that is commensurate with the reduced cable length. For example, reducing the cable loss by 3 dB, by shorter cabling, enables half the transmit power and therefore result in halving the size of the heatsinks and therefore heatsink weight.

By exploiting the small separation distance between the modem and antenna to less than 1 meter, to reduce overall RF power to eliminate the need for heatsinking, overall system mass may be significantly reduced. A lower power diplexer is then used without a heatsink structure.

Figure 10:
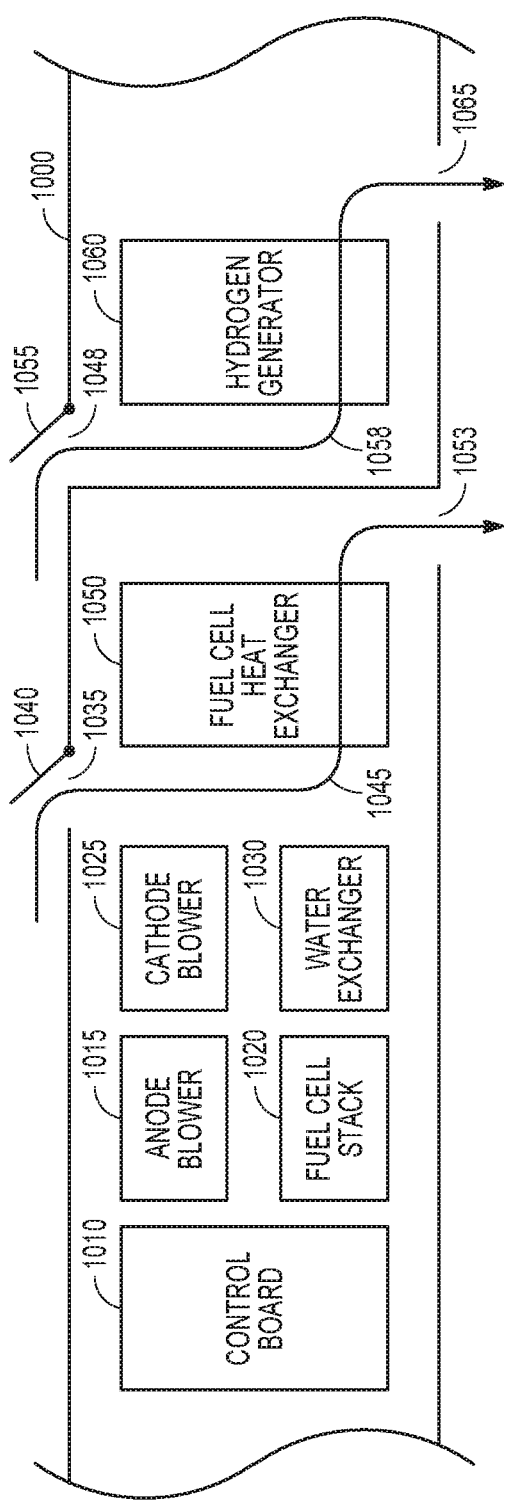
FIG. 10 is a block diagram illustrating a portion of an aircraft fuselage containing a fuel cell-based power source according to an example embodiment.

FIG. 10 is a block diagram illustrating a portion of an aircraft fuselage 1000 containing a fuel cell-based power source according to an example embodiment. The power source may be completely enclosed within the fuselage 1000 in one embodiment and includes a power management and control board 1010 for independently controlling cooling of selected components of the power source as well as managing power generation and battery energy storage.

In one embodiment, the power source includes an anode blower 1015, fuel cell stack 1020, cathode blower 1025, and a water exchanger 1030. These components are shown as arranged blocks within the fuselage 1000, however, the arrangement may be modified in further embodiments. The blowers 1015 and 1025 may be used for controlling movement of gas within respective anode and cathode loops as previous described.

In one embodiment, a first opening or air scoop 1035 in the fuselage 1000 in conjunction with a first controllable damper 1040 may be used to provide cooling airflow, indicated by arrow 1045, to a fuel cell heat exchanger 1050. Airflow may be provided by a propeller or by motion, such as flight of the air system. Arrow 1045 identifies a first portion of the airflow. The heat exchanger 1050 may be part of a fuel cell cooling system that includes a liquid cooling mechanism previously described that removes heat from the fuel cell stack 1020. The control board 1010 may be used to control the damper 1040 to adjust the temperature of the fuel cell stack 1020. The airflow indicated by arrow 1045 exits the fuselage via opening 1053.

A second opening or air scoop 1048 in the fuselage 1000 in conjunction with a second controllable damper 1055 may be used to provide a second portion of the airflow, indicated by arrow 1058, to cool a hydrogen generator 1060 such as by flowing over tubes 505 of the hydrogen generator. The control board 1010 may be used to control the second damper 1050 to control the temperature of the hydrogen generator 1060 based on a sensed temperature of the hydrogen generator 1060. Airflow indicated by arrow 1058 exits the fuselage 1000 via an opening 1065. Note that as the aircraft fuselage varies its speed, the airflow also varies, as does the power required to operation the aircraft. The control board independently may control the temperature of both the fuel cell stack 1020 and the hydrogen generator 1060 to optimize the desired performance of both.

In further embodiments, a single air scoop may be used with airflow gathered from the scoop divided into two portions. A first portion of the airflow may be used to cool the circulating liquid that removed heat from the fuel cell stack. A second portion of the airflow may be used to cool the hydrogen generator.

FIG. 11 is a block schematic diagram of a computer system 1100 to implement control electronics for performing methods and algorithms according to example embodiments. All components need not be used in various embodiments.

One example computing device in the form of a computer 1100 may include a processing unit 1102, memory 1103, removable storage 1110, and non-removable storage 1112. Although the example computing device is illustrated and described as computer 1100, the computing device may be in different forms in different embodiments. For example, the computing device may instead be a smartphone, a tablet, smartwatch, smart storage device (SSD), or other computing device including the same or similar elements as illustrated and described with regard to FIG. 11. Devices, such as smartphones, tablets, and smartwatches, are generally collectively referred to as mobile devices or user equipment.

Although the various data storage elements are illustrated as part of the computer 1100, the storage may also or alternatively include cloud-based storage accessible via a network, such as the Internet or server-based storage. Note also that an SSD may include a processor on which the parser may be run, allowing transfer of parsed, filtered data through I/O channels between the SSD and main memory.

Memory 1103 may include volatile memory 1114 and non-volatile memory 1108. Computer 1100 may include—or have access to a computing environment that includes—a variety of computer-readable media, such as volatile memory 1114 and non-volatile memory 1108, removable storage 1110 and non-removable storage 1112. Computer storage includes random access memory (RAM), read only memory (ROM), erasable programmable read-only memory (EPROM) or electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices, or any other medium capable of storing computer-readable instructions.

Computer 1100 may include or have access to a computing environment that includes input interface 1106, output interface 1104, and a communication interface 1116. Output interface 1104 may include a display device, such as a touchscreen, that also may serve as an input device. The input interface 1106 may include one or more of a touchscreen, touchpad, mouse, keyboard, camera, one or more device-specific buttons, one or more sensors integrated within or coupled via wired or wireless data connections to the computer 1100, and other input devices. The computer may operate in a networked environment using a communication connection to connect to one or more remote computers, such as database servers. The remote computer may include a personal computer (PC), server, router, network PC, a peer device or other common data flow network switch, or the like. The communication connection may include a Local Area Network (LAN), a Wide Area Network (WAN), cellular, Wi-Fi, Bluetooth, or other networks. According to one embodiment, the various components of computer 1100 are connected with a system bus 1120.

Computer-readable instructions stored on a computer-readable medium are executable by the processing unit 1102 of the computer 1100, such as a program 1118. The program 1118 in some embodiments comprises software to implement one or more of the control electronics to manage operation of the power source. A hard drive, CD-ROM, and RAM are some examples of articles including a non-transitory computer-readable medium such as a storage device. The terms computer-readable medium and storage device do not include carrier waves to the extent carrier waves are deemed too transitory. Storage can also include networked storage, such as a storage area network (SAN). Computer program 1118 along with the workspace manager 1122 may be used to cause processing unit 1102 to perform one or more methods or algorithms described herein.

Examples

1. An air system includes a fuselage, a motor supported by the fuselage, a propeller coupled to the motor, a fuel cell-based power generator supported by the fuselage and the motor, and a satellite communication system coupled to the fuel cell system.

2. The system of example 1 wherein the power generator includes a hydrogen generator, a fuel cell having an anode and a cathode, a cathode loop configured to provide oxygen to the cathode, an anode loop configured to provide hydrogen generated by the hydrogen generator to the anode, and an electrical connector coupled to the fuel cell to provide electricity generated by the fuel cell to the motor.

3. The system of example 2 wherein the anode loop includes a hydrogen generator water exchanger coupled to the cathode loop downstream of the cathode to provide water from the cathode loop to the anode loop prior to the hydrogen generator.

4. The system of example 3 wherein the cathode loop includes a fuel cell water exchanger coupled to the cathode loop to heat and humidify gas in the cathode loop.

5. The system of any of examples 2-4 wherein the fuel cell-based power generator includes a battery coupled to receive energy from the fuel cell and to the electrical connector to provide energy to the motor.

6. The system of any of examples 2-5 and further comprising an anode loop blower disposed in the anode loop.

7. The system of any of examples 2-5 and further comprising a cathode loop blower disposed in the cathode loop.

8. The system of any of examples 2-5 and further comprising a liquid cooling loop coupled to remove heat generated by the fuel cell.

9. The system of example 8 and further comprising a radiator coupled to the liquid cooling loop and configured to receive air during flight of the air system to remove heat from the cooling loop.

10. The system of any of examples 8-9 wherein the hydrogen generator includes air cooling passages configured to receive air during flight of the air system to remove heat from the hydrogen generator.

11. The system of any of examples 1-10 wherein the satellite communication system comprises a heat sink free radio frequency power amplification circuit having an antenna configured proximate the circuit via a cable having a length of less than one meter.

12. A system includes a fuselage, a motor supported by the fuselage, a propeller coupled to the motor, a hydrogen generator supported within the fuselage, a fuel cell stack supported within the fuselage, a water exchanger supported within the fuselage, and a water-cooled fuel cell heat exchanger supported within the fuselage.

13. A method includes generating power for an air system via a fuel cell-based power generator, providing power to fly the air system from the fuel cell-based power generator, and cooling a fuel cell and a hydrogen generator of the fuel cell-based power generator via air flow generated by the air system.

14. The method of example 13 wherein the fuel cell-based power generator includes a hydrogen generator, the fuel cell having an anode and the cathode, a cathode loop configured to provide oxygen to the cathode, an anode loop configured to provide hydrogen generated by the hydrogen generator to the anode, and an electrical connector coupled to the fuel cell to provide electricity generated by the fuel cell to the motor.

15. The method of example 14 and further including providing water from the cathode loop to the anode loop using a hydrogen generator water exchanger coupled to the cathode loop downstream.

16. The method of any of examples 14-15 and further including humidifying and heating gas in the cathode loop via a fuel cell water exchanger coupled to the cathode loop.

17. The method of any of examples 14-15 and further including flowing gas in the anode loop via an anode loop blower disposed in the anode loop, and flowing gas in the cathode loop via a cathode loop blower disposed in the cathode loop.

18. The method of any of examples 14-15 wherein cooling the fuel cell includes circulating liquid in a liquid cooling loop including a radiator coupled to remove heat generated by the fuel cell and using a first portion of the airflow to remove heat from the radiator, and wherein cooling the hydrogen generator includes using a second portion of the airflow across a surface of tubes of the hydrogen generator to cool the hydrogen generator.

19. The method of any of examples 18 and further comprising controlling the first portion of the airflow and the second portion of the airflow to independently control temperatures of the fuel cell and hydrogen generator.

20. The method of any of examples 13-19 and further comprising communicating via a satellite communication system having a heat sink free radio frequency power amplification circuit having an antenna configured proximate the circuit via a cable having a length of less than one meter, wherein the communication system is powered by the fuel cell-based power generator.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:

1. An air system comprising:
   a fuselage;
   a motor supported by the fuselage;
   a propeller coupled to the motor;
   a fuel cell-based power generator supported by the fuselage and the motor; and
   a satellite communication system coupled to the fuel cell-based power generator.

2. The system of claim 1 wherein the power generator comprises:
   a hydrogen generator;
   a fuel cell having an anode and a cathode;
   a cathode loop configured to provide oxygen to the cathode;
   an anode loop configured to provide hydrogen generated by the hydrogen generator to the anode; and
   an electrical connector coupled to the fuel cell to provide electricity generated by the fuel cell to the motor.

3. The system of claim 2 wherein the anode loop includes a hydrogen generator water exchanger coupled to the cathode loop downstream of the cathode to provide water from the cathode loop to the anode loop prior to the hydrogen generator.

4. The system of claim 3 wherein the cathode loop includes a fuel cell water exchanger coupled to the cathode loop to heat and humidify gas in the cathode loop.

5. The system of claim 2 wherein the fuel cell-based power generator includes a battery coupled to receive energy from the fuel cell and to the electrical connector to provide energy to the motor.

6. The system of claim 2 and further comprising an anode loop blower disposed in the anode loop.

7. The system of claim 2 and further comprising a cathode loop blower disposed in the cathode loop.

8. The system of claim 2 and further comprising a liquid cooling loop coupled to remove heat generated by the fuel cell.

9. The system of claim 8 and further comprising a radiator coupled to the liquid cooling loop and configured to receive air during flight of the air system to remove heat from the cooling loop.

10. The system of claim 8 wherein the hydrogen generator includes air cooling passages configured to receive air during flight of the air system to remove heat from the hydrogen generator.

11. The system of claim 1 wherein the satellite communication system comprises a heat sink free radio frequency power amplification circuit having an antenna configured proximate the circuit via a cable having a length of less than one meter.

12. A system comprising:
   a fuselage;
   a motor supported by the fuselage;
   a propeller coupled to the motor;
   a hydrogen generator supported within the fuselage;
   a fuel cell stack supported within the fuselage;
   a water exchanger supported within the fuselage; and
   a water-cooled fuel cell heat exchanger supported within the fuselage.

13. A method comprising:
   generating power for an air system via a fuel cell-based power generator;
   providing power to fly the air system from the fuel cell-based power generator; and
   cooling a fuel cell and a hydrogen generator of the fuel cell-based power generator via air flow generated by the air system.

14. The method of claim 13 wherein the fuel cell-based power generator includes the following components to generate power:
   a hydrogen generator;
   the fuel cell having an anode and the cathode;
   a cathode loop configured to provide oxygen to the cathode;
   an anode loop configured to provide hydrogen generated by the hydrogen generator to the anode; and
   an electrical connector coupled to the fuel cell to provide electricity generated by the fuel cell to the motor.

15. The method of claim 14 and further comprising providing water from the cathode loop to the anode loop using a hydrogen generator water exchanger coupled to the cathode loop downstream.

16. The method of claim 14 and further comprising humidifying and heating gas in the cathode loop via a fuel cell water exchanger coupled to the cathode loop.

17. The method of claim 14 and further comprising:
   blowing gas in the anode loop via an anode loop blower disposed in the anode loop; and
   blowing gas in the cathode loop via a cathode loop blower disposed in the cathode loop.

18. The method of claim 14 wherein cooling the fuel cell comprises:
   circulating liquid in a liquid cooling loop including a radiator coupled to remove heat generated by the fuel cell;
   using a first portion of the airflow to remove heat from the radiator; and
   wherein cooling the hydrogen generator comprises using a second portion of the airflow across a surface of tubes of the hydrogenator to cool the hydrogen generator.

19. The method of claim 18 and further comprising controlling the first portion of the airflow and the second portion of the airflow to independently control temperatures of the fuel cell and hydrogen generator.

20. The method of claim 13 and further comprising communicating via a satellite communication system having a heat sink free radio frequency power amplification circuit having an antenna configured proximate the circuit via a cable having a length of less than one meter, wherein the communication system is powered by the fuel cell-based power generator.

* * * * *